United States Patent [19]

Gerhardy

[11] Patent Number: 5,252,261
[45] Date of Patent: Oct. 12, 1993

[54] ADJUSTMENT SAFEGUARD FOR AN ADJUSTING SCREW

[75] Inventor: Reinhard Gerhardy, Korb, Fed. Rep. of Germany

[73] Assignee: Andreas Stihl, Waiblingen

[21] Appl. No.: 29,608

[22] Filed: Mar. 11, 1993

[30] Foreign Application Priority Data

Mar. 31, 1992 [DE] Fed. Rep. of Germany ....... 4210553

[51] Int. Cl.$^5$ .............................................. F02M 3/08
[52] U.S. Cl. ............................ 261/71; 261/DIG. 38; 137/382
[58] Field of Search .................. 261/DIG. 38, 71; 137/382, 385

[56] References Cited

U.S. PATENT DOCUMENTS

| | | | |
|---|---|---|---|
| 3,618,906 | 11/1971 | Charron | 261/71 |
| 4,246,929 | 1/1981 | Wakeman | 261/DIG. 38 |
| 4,271,095 | 6/1981 | Maeda | 261/71 |
| 4,378,321 | 3/1983 | Miller | 261/DIG. 38 |
| 5,094,265 | 3/1992 | Jackson | 137/382 |

FOREIGN PATENT DOCUMENTS

| | | |
|---|---|---|
| 2552100 | 6/1977 | Fed. Rep. of Germany ... 261/DIG. 38 |
| 2855172 | 8/1979 | Fed. Rep. of Germany ... 261/DIG. 38 |

*Primary Examiner*—Tim Miles
*Attorney, Agent, or Firm*—Walter Ottesen

[57] ABSTRACT

The invention is directed to an adjustment safeguard for an adjusting screw rotatably held in a housing. The adjusting screw has a head which projects outside of the housing and a cap is mounted on the head of the adjusting screw so as to be accessible to an operator for imparting a rotational movement thereto. The cap has an appendage formed thereon and stops are provided which coact with the appendage to delimit the rotational range through which the adjusting screw can be rotated. A sleeve is disposed in surrounding relationship to the cap and is connected thereto. The cap is disposed almost entirely within the sleeve so that an operator cannot reach the cap for levering the latter off the adjusting screw without causing permanent visible damage to the safeguard. Accordingly, an effective tampering with the adjusting screw for obtaining a setting outside of the permitted adjusting range is effectively prevented since such a tampering will leave permanent visible damage.

16 Claims, 4 Drawing Sheets

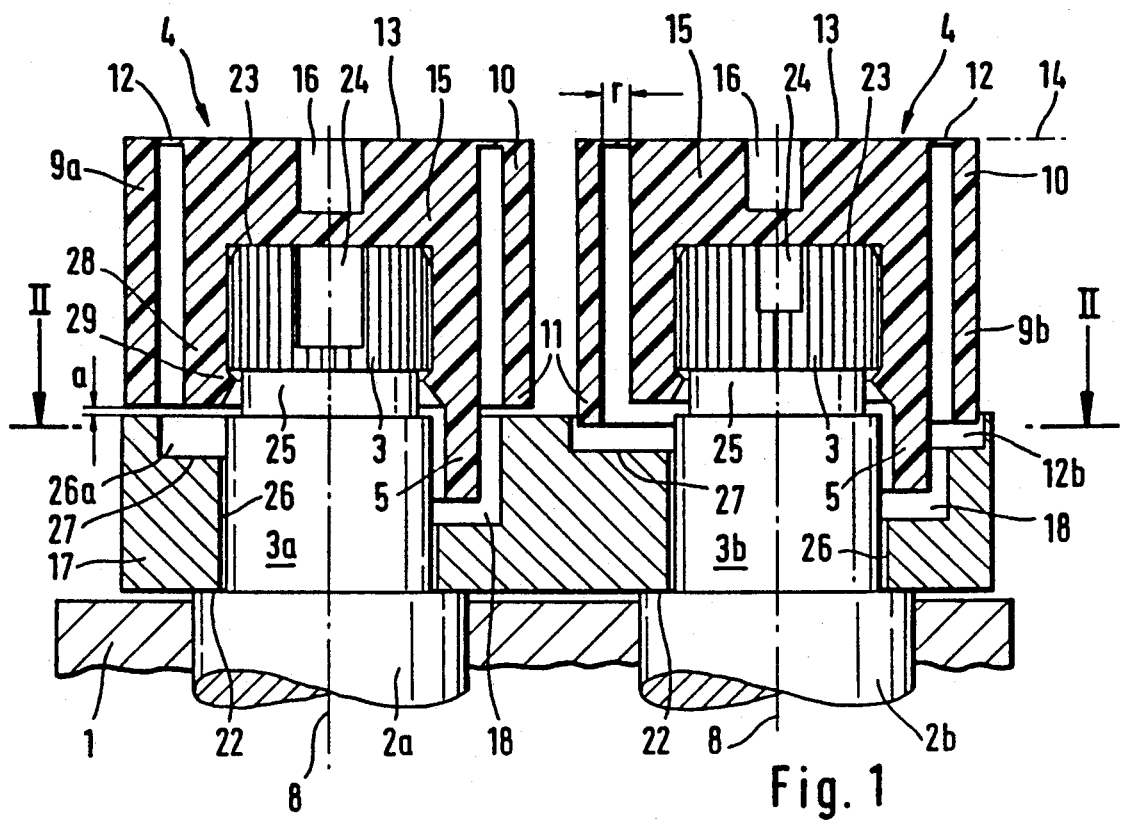
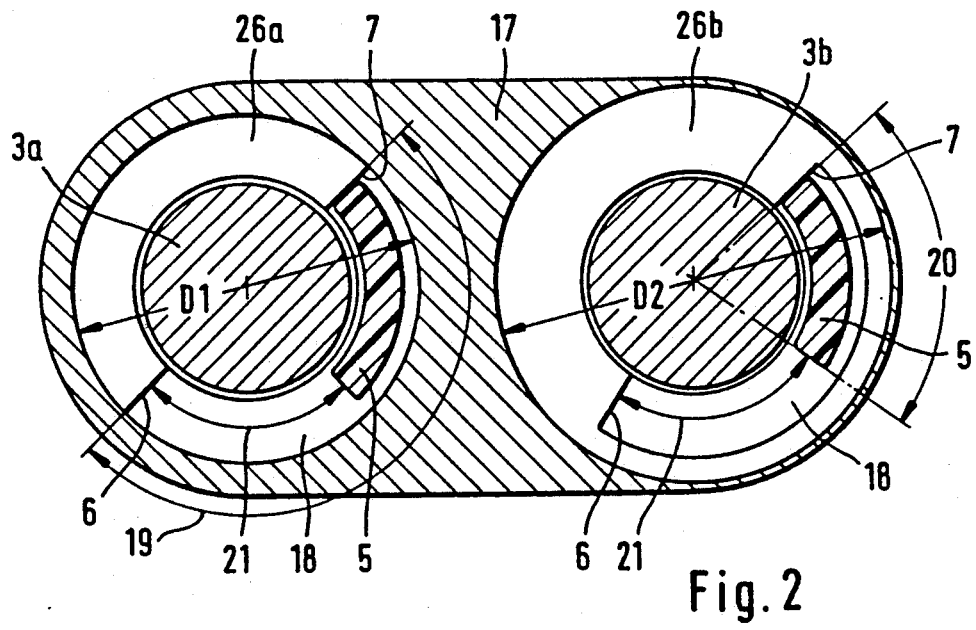

ADJUSTMENT SAFEGUARD FOR AN ADJUSTING SCREW

BACKGROUND OF THE INVENTION

Adjusting screws on carburetors are secured by means of an adjustment safeguard in order to prevent unauthorized adjustment of the idle adjusting screw or the main adjusting screw. The adjusting screws must however be adjustable in work apparatus having two-stroke engines in order to be able to adjust the optimal engine capacity in dependence upon the external operating conditions of the location of use such as the elevation above sea level. The quality of the exhaust gas must also be considered when adapting the adjustment in order to prevent an unnecessary burden to the environment.

U.S. Pat, No. 3,618,906 discloses an adjustment safeguard for an adjusting screw on a carburetor which includes a cap axially held in form-tight engagement. The cap is held on the head of the adjusting screw so that the cap cannot rotate relative to the screw. The cap includes a radial projection which coacts in the direction of rotation of the adjusting screw with a stop fixed to a housing. The cap is pressed onto the adjusting screw so that it cannot be lost after the carburetor is preadjusted. Accordingly, the user can only make an adjustment within the adjusting angle determined by the projection and the stop fixed to the housing. This adjusting possibility is so dimensioned that the exhaust gas quality is maintained which is necessary to keep the burden to the environment low.

The means for limiting the adjusting capability of the adjusting screw is, in practice, often removed from work apparatus especially for carburetors of two-stroke engines in order to adjust the motor capacity desired by the user without consideration as to the poor exhaust gas values. In the case of a check, the adjustment safeguards, which are most often removed by levering them off with a screwdriver, are again pressed into place so that the manipulations made are not easy to recognize visually.

SUMMARY OF THE INVENTION

It is an object of the invention to provide an adjustment safeguard having a permissible limited adjustment path which is so improved that it is not possible to lever off a cap which limits the adjustment path without destroying the adjustment safeguard.

The adjustment safeguard of the invention is for an adjusting screw rotatably held in a housing. The adjusting screw has a head outside of the housing and the adjustment safeguard includes: a cap defining a longitudinal axis and being mounted on the head so as to be accessible to an operator for imparting a rotational movement thereto; holding means for holding the cap on the head to prevent a rotation of the cap relative to the head and to permit the rotational movement to be transmitted to the adjusting screw; the cap having an appendage formed thereon; structure means disposed between the cap and the housing; stop means fixedly provided on the structure means for coacting with the appendage of the cap to define and delimit a rotational range through which the adjusting screw can be rotated; a sleeve connected to one of the structure means and the cap so as to be arranged approximately coaxially with the cap and in radial surrounding relationship thereto; the sleeve and the cap being mutually separated by a small radial clearance (r); the cap having a predetermined length measured along the axis; and, the cap being disposed along the length thereof essentially entirely within the sleeve.

The cap is completely surrounded by the sleeve and is accommodated therein. For this reason, a tool for levering off the cap cannot be placed at the end thereof facing toward the housing without causing permanent visible damage to the cap or to the sleeve. An attempted or completed manipulation on the adjustment safeguard can therefore always be determined so that countermeasures can be taken.

According to a feature of the invention, the end of the sleeve facing away from the housing is connected to the end of the cap facing away from the housing via radial breakable struts. The end of the sleeve facing toward the housing extends up to the vicinity of the housing having the stop.

Tools for manipulation or levering off the cap cannot be applied without applying force to the sleeve. The breakable struts are made especially from a brittle plastic and therefore break with the application of force. Accordingly, the attempted or completed manipulation is permanently visible so that it can be determined at any time. The sleeve lies at a small radial spacing with respect to the cap. For this reason, also forces acting radially on the adjustment safeguard lead to a deformation of the sleeve and therefore to a destruction of the breakable struts. Even gripping the adjustment safeguard with pliers or the like will be permanently visible pursuant to the invention.

An access opening for an adjusting tool is preferably provided in the base of the cap at the side thereof facing away from the housing so that the adjustment forces act exclusively on the cap and are transmitted via the appendage directly to the rotation stop fixed with respect to the housing. A simple frictional connection between the cap and the head is therefore adequate since the connection between the head and the cap remains free of adjusting forces.

The housing part which is fixed against rotation and which has the stop is provided especially in the form of an apertured plate-like member through which the adjustment screw projects. This plate-like member is pushed over the projecting end of the adjusting screw before the cap is pressed on. After pressing the cap in place, the plate-like member is held between the cap and the housing so that it cannot be lost or drop off in the axial direction. The adjustment safeguard according to the invention is easily retrofitted to carburetors of all kinds.

BRIEF DESCRIPTION OF THE DRAWINGS

The invention will now be described with reference to the drawings wherein:

FIG. 1 is a section view taken through an adjustment safeguard mounted on adjusting screws;

FIG. 2 is a section view taken along line II-II of FIG. 1;

DESCRIPTION OF THE PREFERRED EMBODIMENTS OF THE INVENTION

Figure 3:
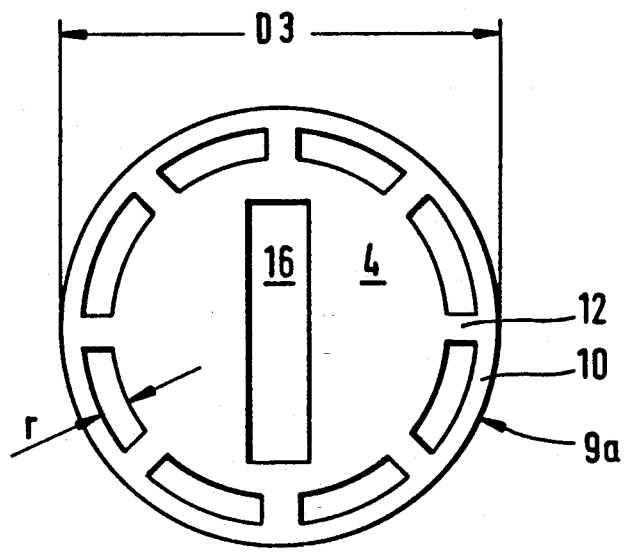
FIG. 3 is a plan view of one of the cap and sleeve units of the adjustment safeguard of FIG. 1.

The adjustment safeguard arrangement shown in FIG. 1 safeguards the adjusting screws (2a, 2b) held so as to be rotatable in a housing 1. The adjusting screws (2a, 2b) can be the idle adjusting screw, the main adjusting screw or like adjusting screws on a carburetor such as a membrane carburetor or the like. Carburetors of this kind are used for internal combustion engines and especially for two-stroke engines which are utilized as drive motors in work apparatus such as motor-driven chain saws, cutoff machines, brushcutters or the like. The adjusting screws (2a, 2b) are threadably engaged in the housing 1 of the carburetor. The end segments (3a, 3b) project from the housing 1 and are each configured to be smaller in diameter and have an annular shoulder 22. The free adjusting screw. The head 3 has an end face 23 wherein an engaging slot 24 is provided to permit engagement with an adjusting tool such as a screwdriver or the like. The head 3 is set off from the remaining end segment by a peripheral slot 25.

After the adjusting screws (2a, 2b) are properly adjusted, a common apertured plate-like member 17 is pushed over the end segments 3a and 3b with the end segments 3a and 3b then projecting through respective through bores 26 of the plate-like member 17. The plate-like member 17 has a side facing toward the housing 1 and lies with this side against at least one annular shoulder 22. Because of two adjusting screws 2a and 2b threadably engaged in the housing 1, the plate-like member 17 is a housing part which is fixed so that it cannot rotate in the rotational direction of these two screws. If an individual plate-like member were used for each adjusting screw, then the plate-like member would have to be fixed to the housing 1 so that it cannot rotate with respect thereto.

The through bores 26 are configured so as to be expanded at their ends (26a, 26b) facing toward the head 3. A slot 18 is provided in the wall portion of the member 17 which defines the through bore 26. This slot 18 extends over a portion of the periphery and axially opens to the widened ends (26a, 26b). The slot 18 can therefore also be characterized as a slot machined axially into the shoulder 27. As shown in FIG. 2, the slot 18 subtends a peripheral angle 19.

An appendage 5 of a cap 4 extends axially into the slot 18. The cap 4 is held on the head 3 of the adjusting screw (2a or 2b) so as to be fixed against rotation with respect thereto. The head 3 has an outer knurl (knurled surface) to hold the cap so that it cannot rotate with respect thereto. When the cap is pressed onto the head 3, the outer knurl is pressed into the plastic of which the cap is made. It can be advantageous to provide the cap 4 with a counter knurled surface.

An inner lip 29 is formed at the end 28 of the cap facing toward the housing 1. The inner lip engages in the peripheral slot 25 and holds the cap 4 on the adjusting screw (2a or 2b) in a form-tight manner so that it cannot be axially separated therefrom. The lip 29 can be configured as a latch element.

As shown in FIG. 2, the slot 18 has a peripheral angle 19 which is greater than the peripheral angle 20 subtended by the appendage 5. In the embodiment shown, the peripheral angle 19 is 180°; whereas, the peripheral angle 20 is 90°. The ends of the slot 18 lying in the peripheral direction define respective stops 6 and 7 which are fixed with respect to the housing. The appendage 5 runs up against these stops. An adjustment angle 21 of b 90° or one quarter turn is provided for the adjusting screws (2a or 2b) because of the selected dimensions of the peripheral angles 19 and 20. An adjusting angle 21 of approximately 350° can be obtained by making the slot 18 appropriately long and by appropriately selecting the peripheral length of the appendage 5. Thus, a permissible adjustment of almost a complete rotation is possible.

An engaging opening 16 is provided in the base 15 of the cap 4 facing away from the housing 1. This opening 15 is preferably in the form of an engaging slot for an adjusting tool such as a screwdriver or the like. The adjusting screw (2a or 2b) safeguarded by the cap 4 can be adjusted in the range of the adjusting angle 21 by means of the worktool engaging the engaging opening 16. The adjusting forces introduced act exclusively on the cap and its appendage 5 lying parallel to the axis 8 of the adjusting screw (2a and 2b). The positive tight connection between the head 3 of the adjusting screw and the cap 4 is free of adjusting forces.

The adjusting cap 4 is surrounded by a sleeve (9a or 9b) which is arranged coaxially to the cap 4 and to the axis 8 of the adjusting screw (2a or 2b). A small radial spacing (r) is provided between the outer surface of the cap 4 and the inner surface of the sleeve (9a or 9b).

The end 10 of the sleeve (9a or 9b) facing away from the housing 1 is connected to the end 13 of the cap 4 by breakable struts 12 (see FIGS. 1 and 3). The end 10 of the sleeve (9a or 9b) and the end 13 of the cap 4 lie approximately in a common plane 14 and the breakable struts 12 preferably also lie in this plane. The cap 4 is made of plastic and the sleeve (9a or 9b) is likewise made of plastic. The cap 4 and the sleeve (9a or 9b) can also be connected to each other via breakable struts which are arranged, for example, at a location corresponding to half of the axial length. This can be advantageous for the injection molding process.

In the safeguard shown in the left-hand portion of FIG. 1, the end 11 of the sleeve 9a facing toward the housing 1 lies closely adjacent the housing part 17 having the stop. The spacing (a) of the end 11 from the housing part 17 is dimensioned in such a manner that the gap which remains is too narrow to permit a screwdriver or a similar tool from extending radially up to the end 28 of the cap 4. The spacing (a) compensates for tolerances and considers further a possible axial displacement of the housing part 17 (the apertured plate-like member 17) relative to the adjusting screws 2a and 2b because of the possible adjustment range of the adjustment angle 21. In the safeguard shown in the left-hand portion of FIG. 1, the axial length of the sleeve 9a is configured to be the same as the axial length of the cap 4. The inner diameter $D_1$ of the end 26a of the through bore 26 facing toward the sleeve corresponds to the inner diameter of the sleeve 9a.

In the safeguard shown in the right-hand portion of FIG. 1, the axial length of the sleeve 9b is longer than the axial length of the cap 4. The end 26b facing toward the sleeve is widened and the inner diameter $D_2$ (FIG. 2) of the end 26b of the through bore 26 is greater than the outer diameter $D_3$ (FIG. 3) of the sleeve. The end 11 of sleeve 9b faces toward the housing 1 and this end 11 of the sleeve 9b projects into the expanded end 26. An axial application of force by means of a screwdriver or the like on the cap 4 is made impossible by this overlapping. The possible axial clearance of the end 11 with respect to the housing part 17 can be significantly greater than the clearance (a) for the safeguard shown in the left-hand portion of FIG. 1. The safeguard shown in the right-hand portion of FIG. 1 is therefore especially suitable for larger adjustment ranges of up to one rotation of the adjusting screw.

The cap 4, the appendage 5, the sleeve (9a or 9b) as well as the breakable struts 12 are made as a single plastic part. The plastic is preferably hard to brittle. This ensures that the breakable struts 12 will break when there is a manipulation on the adjustment safeguard whereby a permanent visual indication of a completed or attempted manipulation is provided.

The cap 4 is held on the head 3 of the adjusting screw (2a or 2b) by means of a friction connection. In lieu of such a connection, it is also possible to provide a form-tight connection between the cap and the adjusting screw by means of which a rotation of the cap 4 relative to the head 3 is prevented.

The plate-like member defining the housing part 17 is held between the annular shoulder 22 of the adjusting screw (2a or 2b) and the cap 4 and/or the sleeve (9a or 9b) so that it cannot become separated in the axial direction. The configuration of the stops 6 and 7 in the housing part 17 make it possible to retrofit existing carburetors without it being necessary to make changes to the carburetor housing itself. The stops 6 and 7 are fixed against rotation relative to the housing 1. Only the adjusting screws 2a and 2b have to be exchanged and, after adjusting the adjusting screws, the common apertured plate-like member 17 is pushed over the narrowed segments 3a and 3b and, thereafter, a cap having a sleeve connected to the cap via breakable struts is pushed onto the head 3 of each adjusting screw.

Figure 6:
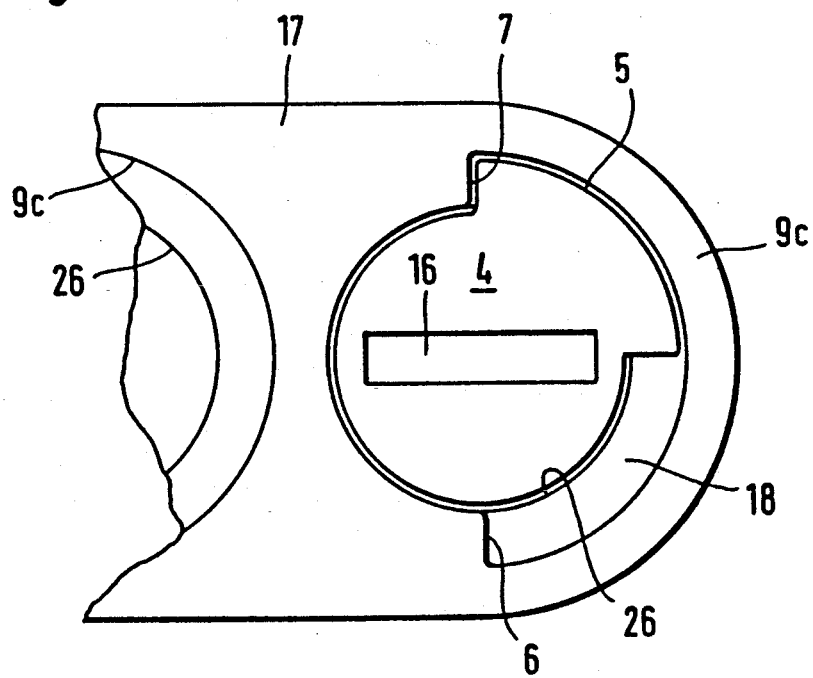
FIG. 6 is a partial plan view of the adjustment safeguard of FIG. 4.
Figure 4:
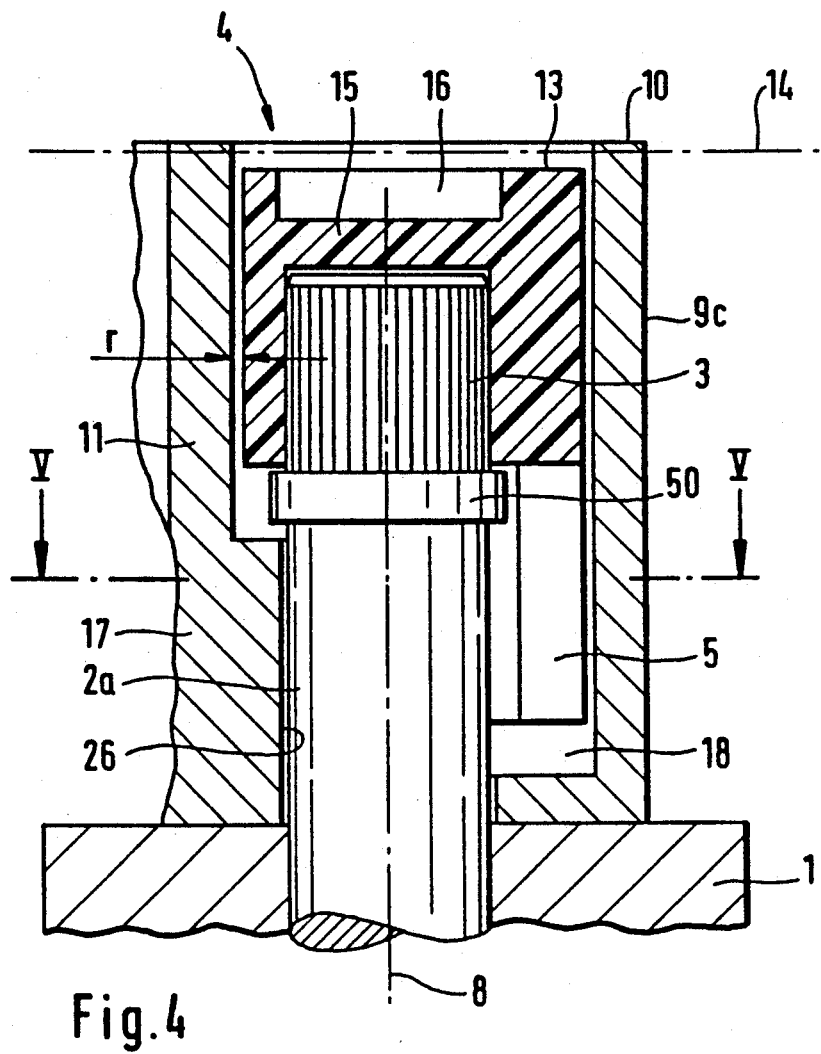
FIG. 4 is a section view taken through an embodiment of the adjustment safeguard of the invention which includes a sleeve fixed against rotation.
Figure 5:
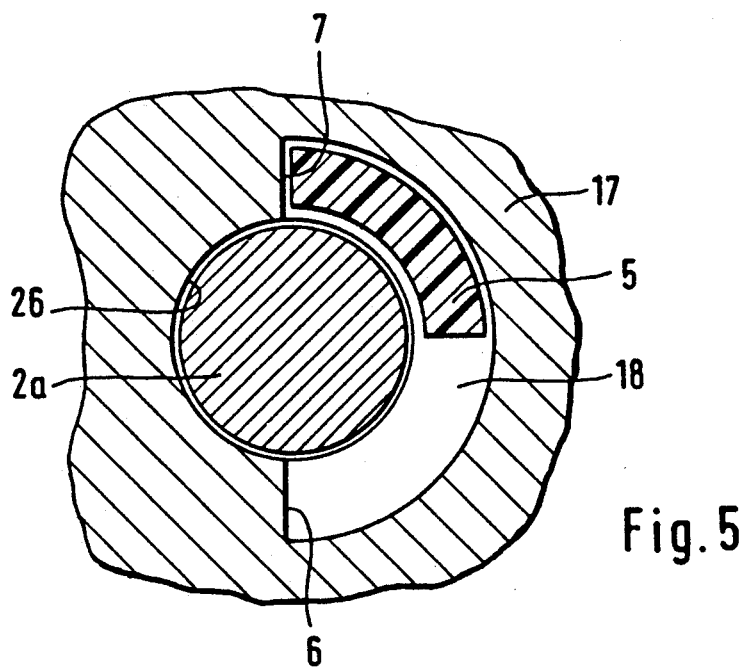
FIG. 5 is a detail section view taken along line V-V of FIG. 4.

In the embodiment shown in FIGS. 4 to 6, the sleeve 9c is fixedly connected at its end 11 to the apertured plate-like member 17. The sleeve 9c surrounds the cap 4 with a radial clearance (r) and the end 11 of the sleeve 9c faces toward the housing 1. Preferably, the plate-like member 17 is formed as a single piece with the sleeve 9c. The end 10 of the sleeve 9c as well as the end 13 of the cap 4 terminate approximately at a common plane 14. As shown in the plan view of FIG. 6, the sleeve 9c is provided as a bore or recess in the plate-like member 17. This bore or recess has an expanded diameter.

The cap 4 is completely received in the sleeve 9c and has an axial appendage 5, which engages in a housing slot 18, in the same manner as shown for the embodiments of FIGS. 1 to 3. The stops 6 and 7 define the respective peripheral ends of the slot 18. The adjusting screw 2a is first pushed through the bore 26 of the housing part 17 and is threadably engaged in the housing 1 as well as being coarsely preadjusted. The cap 4 is then pushed onto the head 3 of the adjusting screw with the head 3 lying in the sleeve 9c. The cap 4 is held tightly on the head 3 in a positive or form-tight manner. The cap 4 cannot become axially separated from the head 3 and is connected to the adjusting screw 2a so that it cannot rotate relative thereto about the longitudinal axis 8. The cap 4 is pushed on up to a collar 50 of the adjusting screw 2a. The collar 50 separates the head 3 of the adjusting screw 2a from the remainder thereof. The collar 50 can at the same time limit the axial depth to which the adjusting screw 2a can threadably engage. The housing part 17 is held between the collar 50 and the housing 1. A second adjusting screw is passed through the second bore 26 (FIG. 6) and is threadably engaged in the housing 1. This second adjusting screw fixes the housing part 17 against rotation. The housing part 17 can also be fixed so that it does not rotate by utilizing pins or the like.

Intervention utilizing a screwdriver between the sleeve 9c and the cap 4 cannot take place without damaging the cap 4 because of the small clearance (r) so that manipulations which are attempted or carried out can be recognized by permanent visible damage of the cap 4.

Figure 7:
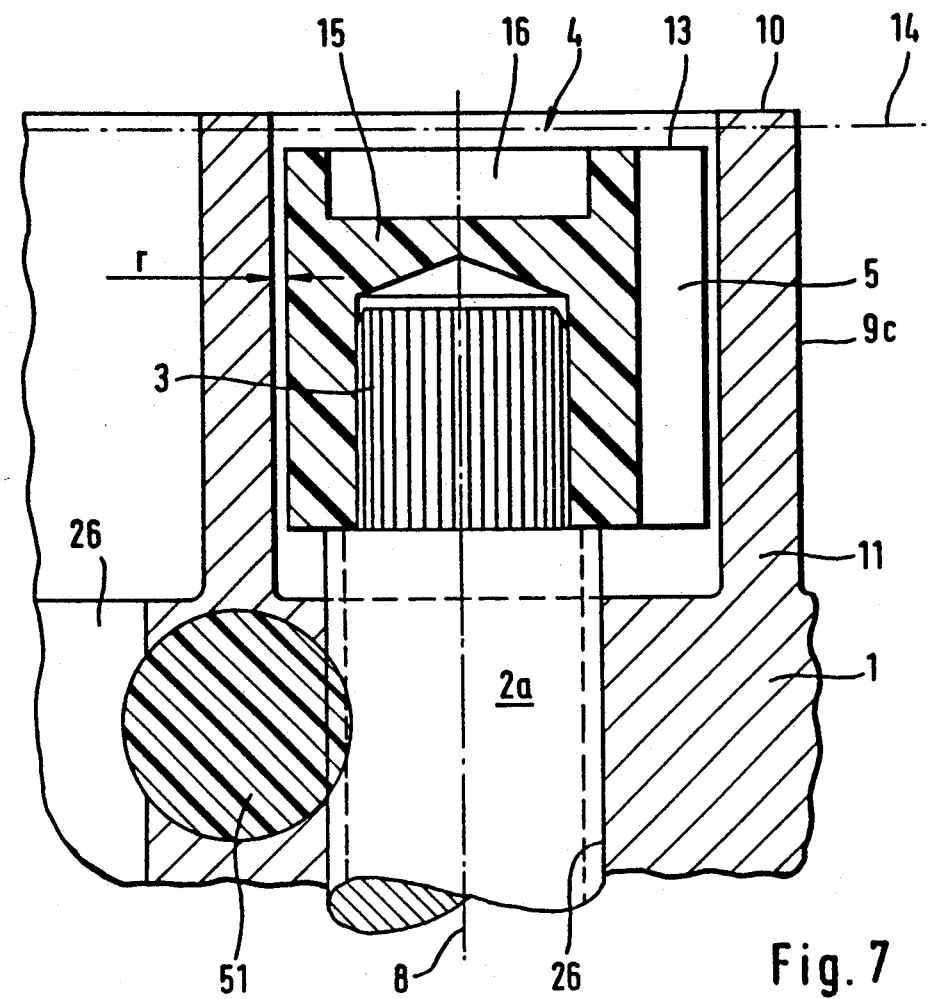
FIG. 7 is a section view taken through another embodiment of the adjustment safeguard of the invention; and, FIG. 8 is a partial plan view of the adjustment safeguard of FIG. 7.
Figure 8:
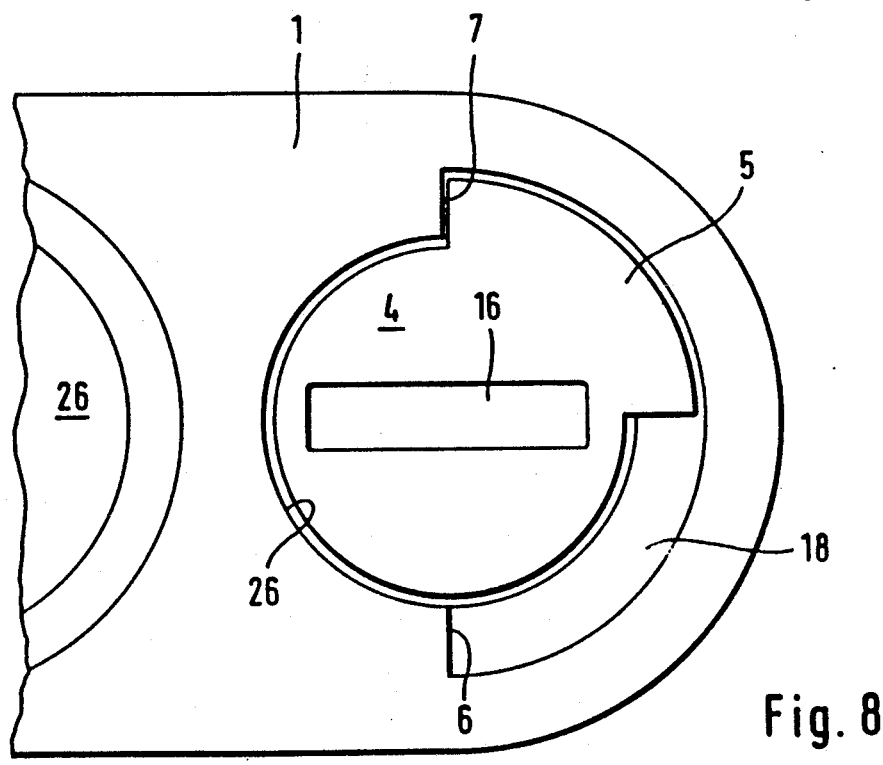

The plate-like member or housing part 17 is omitted entirely in the embodiment shown in FIGS. 6 and 7. The stops 6 and 7 as well as the sleeve 9c are configured directly on the housing 1. For this purpose, a projection or the like can be formed on the housing 1 and this projection can be appropriately machined. Preferably, the projection is formed as a single piece with the housing 1. The appendage 5 limiting the adjusting angle is provided as an outer axial rib of the outer surface of the cap 4. The rib extends essentially over the entire height of the cap 4. The rib-shaped appendage 5 coacts with the stops 6 and 7 (FIG. 8) in the annular space between the cap 4 and the sleeve 9c. The stops 6 and 7 are fixed with respect to the housing and limit the adjustment range of the adjusting screw 2a. The radial space (r) of the sleeve 9c to the cap 4 is maintained so small that intervention with a screwdriver is not possible in order to lever off the cap 4 without damage. For this reason, a manipulation of the adjusting screw 2a, which cannot be visually detected, is prevented.

A plastic piece 51 is provided transversely to the threaded bore 26 as shown and extends into the threaded bore 26. This plastic piece 51 holds the adjusting screw 2a threadably engaged in housing 1 in the selected rotational position. The thread of the adjusting screw 2a presses into the plastic piece 51 whereby the screw is restrained and an unwanted displacement of the adjusting screw 2a because of vibrations or the like is reliably prevented.

It is understood that the foregoing description is that of the preferred embodiments of the invention and that various changes and modifications may be made thereto without departing from the spirit and scope of the invention as defined in the appended claims.

What is claimed is:

1. An adjustment safeguard for an adjusting screw rotatably held in a housing, the adjusting screw having a head outside of the housing, the adjustment safeguard comprising:

a cap defining a longitudinal axis and being mounted on said head so as to be accessible to an operator for imparting a rotational movement thereto;

holding means for holding said cap on said head to prevent a rotation of said cap relative to said head and to permit said rotational movement to be transmitted to said adjusting screw;

said cap having an appendage formed thereon;

structure means disposed between said cap and said housing;

stop means fixedly provided on said structure means for coacting with said appendage of said cap to define and delimit a rotational range through which said adjusting screw can be rotated;

a sleeve connected to one of said structure means and said cap so as to be arranged approximately coaxially with said cap and in radial surrounding relationship thereto;

said sleeve and said cap being mutually separated by a small radial clearance (r);

said cap having a predetermined length measured along said axis; and, said cap being disposed along said length thereof essentially entirely within said sleeve.

2. The adjustment safeguard of claim 1, said cap and said sleeve having respective outer ends facing away from said housing; and, said outer ends lying approximately in a common plane.

3. The adjustment safeguard of claim 2, said cap being connected to said sleeve; and, said adjustment safeguard further comprising breakable struts for defining the connection between said sleeve and said cap; said breakable struts being arranged to interconnect said cap and said sleeve at said outer ends; and, said sleeve having an inner end facing toward said housing and said sleeve extending toward said housing so as to cause said inner end to be close to said structure means.

4. The adjustment safeguard of claim 3, said breakable struts being disposed so as to be located in said common plane.

5. The adjustment safeguard of claim 3, said lower end and said structure means being configured so as to overlap each other.

6. The adjustment safeguard of claim 1, said stop means being interposed between said cap and said sleeve.

7. The adjustment safeguard of claim 1, said adjusting screw having a longitudinal axis coincident with said longitudinal axis of said cap; and, said appendage being formed on said cap so as to extend approximately parallel to said axis toward said housing.

8. The adjustment safeguard of claim 1, said sleeve being configured as a single integral piece with said structure means.

9. The adjustment safeguard of claim 1, said appendage having a predetermined width measured in the direction of a circle concentric with said axis; said structure means having a slot formed therein to have an arcuate length longer than said width measured along said circle; said appendage being configured to extend into said slot so as to move therein when said cap is rotated; and, said stop means including a wall forming a peripheral end of said slot to coact with said appendage to define one end of said rotational range.

10. The adjustment safeguard of claim 9, said appendage subtending an angle of approximately 90° having a vertex on said axis.

11. The adjustment safeguard of claim 1, said cap having an outer end facing away from said housing; and, said cap having an opening formed in said outer end for receiving an adjusting tool of the operator therein.

12. The adjustment safeguard of claim 1, said structure means being an apertured plate-like member having a through hole formed therein to permit said adjusting screw to extend therethrough; and, said adjustment safeguard further comprising fixing means for fixing said apertured plate-like member to prevent said member from rotating relative to said housing.

13. The adjustment safeguard of claim 1, said housing being a carburetor housing of a carburetor such as a membrane carburetor of a portable handheld work apparatus; and, said adjusting screw being an adjusting screw of said carburetor.

14. An adjustment safeguard for two adjusting screws of a carburetor such as a membrane carburetor of a portable handheld work apparatus, the adjusting screws being rotatably held in a housing of the carburetor, the adjusting screws each having a head outside of the housing, the adjustment safeguard comprising:

two caps defining respective longitudinal axes and being mounted on corresponding ones of the heads of said adjusting screws so as to be accessible to an operator for imparting a rotational movement thereto;

holding means for holding each of said caps on the head corresponding thereto to prevent a rotation of the cap relative to the head and to permit the rotational movement to be transmitted to the corresponding adjusting screw;

each of said caps having an appendage formed thereon;

an apertured plate disposed between said caps and said housing and having through holes formed therein for corresponding ones of said adjusting screws;

stop means fixedly provided on said apertured plate for coacting with said appendages of said caps to define and delimit respective rotational ranges through which said adjusting screws can be rotated;

two sleeves connected to said caps respectively so as to be arranged approximately coaxially with the cap corresponding thereto and in radial surrounding relationship thereto;

each of said sleeves and the cap corresponding thereto being mutually separated by a small radial clearance (r);

each of said caps having a predetermined length measured along said axis; and, each of said caps being disposed along said length thereof essentially entirely within said sleeve corresponding thereto.

15. An adjustment safeguard for an adjusting screw rotatably held in a housing, the adjusting screw having a head outside of the housing, the adjustment safeguard comprising:

a cap defining a longitudinal axis and being mounted on said head so as to be accessible to an operator for imparting a rotational movement thereto;

holding means for holding said cap on said head to prevent a rotation of said cap relative to said head and to permit said rotational movement to be transmitted to said adjusting screw;

said cap having an appendage formed thereon;

stop means fixedly provided on said housing for coacting with said appendage of said cap to define and delimit a rotational range through which said adjusting screw can be rotated;

a sleeve formed on said housing so as to extend upwardly therefrom so as to be arranged approximately coaxially with said cap and in radial surrounding relationship thereto;

said sleeve and said cap being mutually separated by a small radial clearance (r);

said cap having a predetermined length measured along said axis; and, said cap being disposed along said length thereof essentially entirely within said sleeve.

16. The adjustment safeguard of claim 15, said sleeve having an inner wall surface and said sleeve having an arcuate slot formed therein; said stop means including two end walls at respective ends of said arcuate slot; and, said appendage being a radial projection for coacting with said end walls to delimit said rotational range.

* * * * *

UNITED STATES PATENT AND TRADEMARK OFFICE
CERTIFICATE OF CORRECTION

PATENT NO. : 5,252,261
DATED : October 12, 1993
INVENTOR(S) : Reinhard Gerhardy

It is certified that error appears in the above-identified patent and that said Letters Patent is hereby corrected as shown below:

In column 1, line 18: delete "Pat," and substitute -- Pat. -- therefor.

In column 3, line 25: between "free" and "adjusting", insert -- end of the end segments (3a, 3b) each defines a head 3 of the --.

In column 4, line 9: between "of" and "90°", delete -- b --.

Signed and Sealed this

Twenty-second Day of March, 1994

Attest:

BRUCE LEHMAN

Attesting Officer    Commissioner of Patents and Trademarks